US012686038B2

(12) United States Patent
Gronholz et al.

(10) Patent No.: US 12,686,038 B2
(45) Date of Patent: Jul. 21, 2026

(54) METHOD AND DEVICE FOR WASHING/CLEANING GRANULAR MATERIAL FROM SLAG AND WASHING/CLEANING BOTTOM/BOILER ASH FROM A THERMAL WASTE TREATMENT, AND MINERAL RESIDUE AND RECYCLING MATERIAL

(71) Applicant: H-U-R HAMBURG GMBH HAMBURGER-UMWELT-RECYCLINGTECHNOLOGIEN, Hamburg (DE)

(72) Inventors: Claus Gronholz, Ahausen OT Eversen (DE); Andre Gronholz, Tangstedt (DE)

(73) Assignee: PRO CLIR GMBH, Ahausen (DE)

( * ) Notice: Subject to any disclaimer, the term of this patent is extended or adjusted under 35 U.S.C. 154(b) by 0 days.

(21) Appl. No.: 18/018,063

(22) PCT Filed: Jul. 27, 2021

(86) PCT No.: PCT/EP2021/071074
§ 371 (c)(1),
(2) Date: Jan. 26, 2023

(87) PCT Pub. No.: WO2022/023382
PCT Pub. Date: Feb. 3, 2022

(65) Prior Publication Data

US 2023/0256481 A1 Aug. 17, 2023

(30) Foreign Application Priority Data

Jul. 27, 2020 (DE) ..................... 10 2020 119 699.7

(51) Int. Cl.
*B08B 3/12* (2006.01)
*B03B 5/50* (2006.01)

(52) U.S. Cl.
CPC ................ *B08B 3/123* (2013.01); *B03B 5/50* (2013.01)

(58) Field of Classification Search
CPC .. B08B 3/123; B08B 3/12; B03B 5/50; B03B 5/00
See application file for complete search history.

(56) References Cited

U.S. PATENT DOCUMENTS 3,222,221 A * 12/1965 Branson .................. B08B 3/123 366/115
4,964,576 A * 10/1990 Datta ..................... B03D 1/245 241/20

(Continued)

FOREIGN PATENT DOCUMENTS

JP 2009262036 A * 11/2009

OTHER PUBLICATIONS

International Search Report issued for corresponding PCT International Application No. PCT/EP2021/0070506 on Nov. 19, 2021.

*Primary Examiner* — Douglas Lee
(74) *Attorney, Agent, or Firm* — Howson & Howson LLP

(57) ABSTRACT

The invention relates to a method for washing/cleaning granular material from slag and for washing/cleaning bottom/boiler ash from a thermal waste treatment. In the method, the granular material is added to a process liquid and is subjected to ultrasound therein. According to the invention, it is proposed that the process liquid is located in an upright cleaning channel with an upper feeding end and a lower extraction end, that the granular material is introduced into the cleaning channel from the feeding end, and moves downwards towards the extraction end due to the force of gravity, and is subjected to ultrasound during the sinking movement.

6 Claims, 4 Drawing Sheets

(56) References Cited

U.S. PATENT DOCUMENTS

Figure 1:
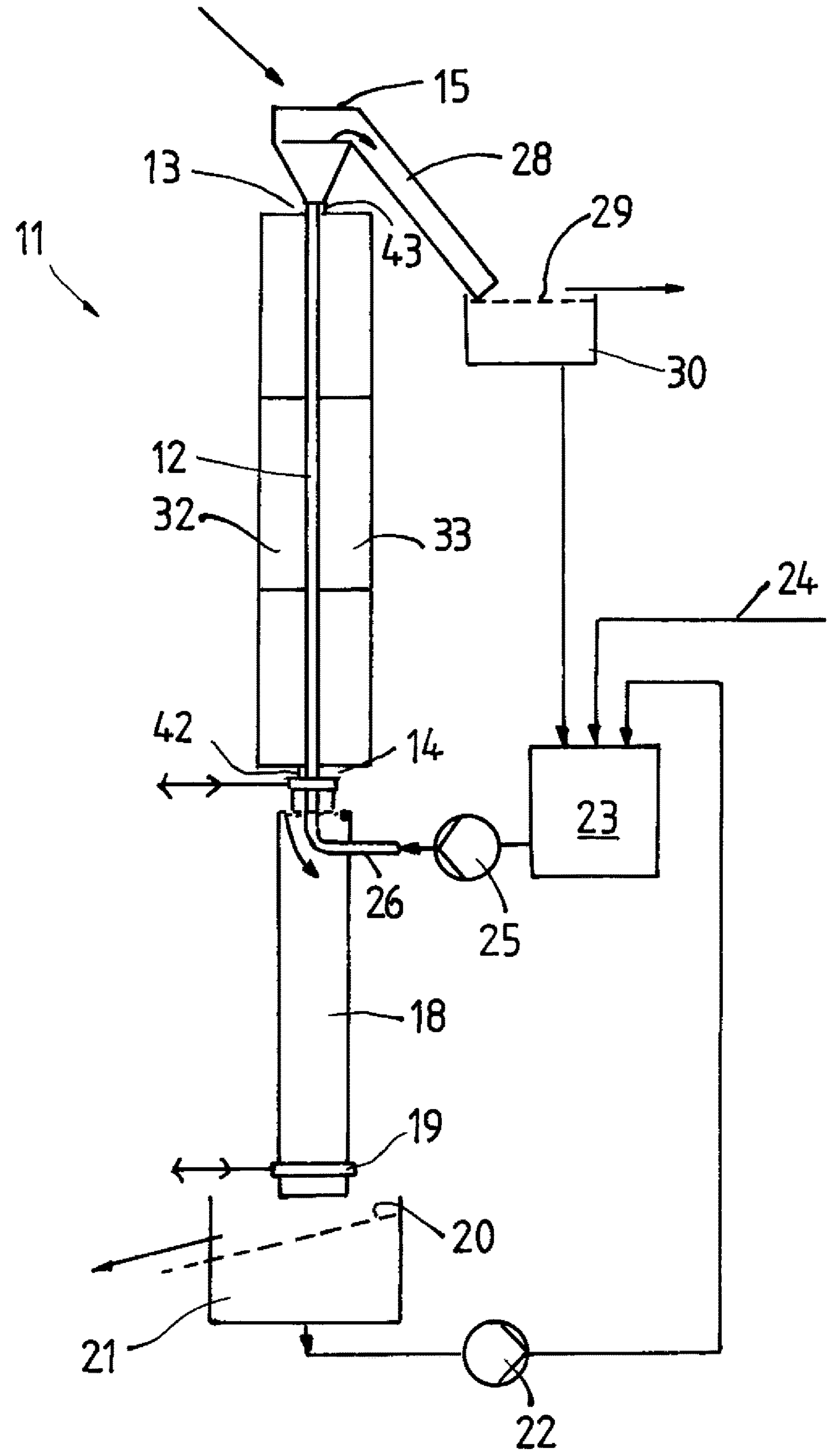

| | | | | |
|---|---|---|---|---|
| 5,592,753 | A | 1/1997 | Gronholz | |
| 5,799,410 | A | 9/1998 | Gronholz | |
| 7,891,593 | B2 | 2/2011 | Gronholz | |
| 8,777,142 | B2 | 7/2014 | Gronholz | |
| 2010/0230329 | A1* | 9/2010 | Kittrick | B03B 1/00 209/157 |
| 2015/0048187 | A1 | 2/2015 | Gronholz | |
| 2020/0030814 | A1 | 1/2020 | Gronholz | |
| 2020/0038924 | A1 | 2/2020 | Gronholz | |
| 2020/0129986 | A1 | 4/2020 | Gronholz | |
| 2025/0018442 | A1 | 1/2025 | Gronholz et al. | |

* cited by examiner

METHOD AND DEVICE FOR WASHING/CLEANING GRANULAR MATERIAL FROM SLAG AND WASHING/CLEANING BOTTOM/BOILER ASH FROM A THERMAL WASTE TREATMENT, AND MINERAL RESIDUE AND RECYCLING MATERIAL

The invention relates to a method for washing/cleaning granular material from slag and for washing/cleaning bottom/boiler ash from a thermal waste treatment. In the method, the granular material is added to a process liquid and is subjected to ultrasound therein. In particular, the invention relates to cleaning of slag from domestic waste incineration plants, so-called DWIP-slag or domestic waste incineration ash. Furthermore, the invention relates to a device for releasing salt deposits, metal/heavy metal compounds as well as semi-metals, such as antimony and its chemical compounds which shall be referred to hereunder as environmentally harmful deposits or attachments, on slag granular material. In particular, salts such as chlorides and sulphates which are located in the pores and the fissured surfaces of said granular grains and which cannot be removed or can be removed insufficiently only by conventional washing methods, shall be released and removed. Said granular material can have any grain size. But environmentally harmful deposits/attachments shall be removed in particular from granular material having a grain size of 0.25/12.5 mm or 0.5/4.0 mm. Hereinafter, this patent will refer to slag granular or granular material without any intention to imply any restriction.

Thermal recovery of domestic waste causes large amounts of bottom/boiler ash residues which must be disposed of. Apart from minerals, such bottom/boiler ash also contains metal, stones, or glass, other residues which had not been burnt or are not combustible, such as harmful substances which do not allow and enable simple landfilling. Even any other application of bottom/boiler ash, for example as filling or construction material in the building industry, is not easily possible or not possible at all because of the harmful substances contained therein. Nevertheless, an application of processed bottom/boiler ash, hereinafter also referred to as slag, as filling material or foundation or subbase construction material in the building industry would be desirable as in this way, the slag could be traded as a mineral construction material. Thus, landfilling as well as extraction of raw materials, such as gravel, natural stones, and sand, which would otherwise be necessary for such an application, will no longer be necessary.

In order to enable application of granular material as construction material, for example in road construction, it must meet predetermined critical values identified with respect to specific harmful substances. In Germany, these are for example the technical rules of the regional waste working group "Technische Regeln der Länderarbeitsgemeinschaft Abfall" (TR-LAGA). Depending on the harmful substance content, slag is graded in specific grading values Z0, Z1, Z2, Z3, and higher. Slag having a grading value Z0 can be applied in any way whatsoever. A grading value Z1 allows for an application as construction material without any additional technical auxiliary equipment. With respect to the grading value Z1, "TR LAGA Boden" (soil) differentiates between a value Z1.1 and Z1.2. Sealing measures must be taken for a grading value Z2 in order to prevent washing-out of harmful substances from the slag which would result into pollution of the soil or the ground water. Therefore, slag granular material having a grading value Z1 are of great importance for the construction industry. Apart from TR-LAGA, DWIP-slag is also graded pursuant to the body of rules of "TL-Gestein StB" ("Technische Lieferbedingungen für Gesteinskörnungen im Straßenbau"—technical delivery terms for aggregates in road construction). In this respect, differentiation is made between a slag pursuant to DWIP-1 pursuant to "TL-Gestein StB", which allows significant lower harmful substance contents, and a slag pursuant to SWIP-2 pursuant to "TL-Gestein StB".

Measures known in the art enable removal of metal from shred slag relatively well. But problems are caused by the surface structure of the various slag grains which is open-pored and fissured. Said environmentally harmful substances and in particular chlorides and sulphates preferably deposit in such pores, making it impossible to remove them by simple washing methods. But chlorides and sulphates are contained in slag from domestic waste incineration plants in relatively big amounts, exceeding by far the critical values for the grading values Z1 or Z2 pursuant to TR-LAGA. However, this also entails a grading value in excess of Z2 when critical values of other harmful substances must be met, such that restricted recovery as construction material is no longer possible.

As an example, the TR-LAGA critical value (as of November 2003) for the chloride grading value of Z1.1 comes to 20 mg/l, for the grading value Z1.2 to 40 mg/l and for the grading value Z2 to 150 mg/l. The TR-LAGA critical value for the sulphate grading value Z1.1 comes to 150 mg/l, for the grading value Z1.2 to 300 mg/l and for the grading value Z2 to 600 mg/l. For eluate determination purposes of slag from typical domestic waste incineration plants without any processing, the values measured for chloride come to a range of 590 mg/l and for sulphate to 640 mg/l, i.e. far beyond the critical values. Herein, the quantity stated in litres refers to the eluate according to DIN EN ISO 10304-1/-2 D19/20. Different and diverging rules can be applicable in various countries.

Conventional washing of said slag granular material enables reduction of such eluate values to approximately 130 mg/l for chloride and to approximately 320 mg/l for sulphate. But even these values do not allow for any classification into the grading value of Z1.

A method and a device for cleaning of slag of the type as described hereinabove is known in the art from WO 2018/138169 A1. Therein, the arrangement is made such as that the granular material to be cleaned is discontinuously immersed in processing baskets into a water quench where such granular material is subjected to ultrasound by means of an immersible transducer. Changing cleaned granular material is relatively complex. It has also turned out that efficiency of said ultrasound processing is negatively impacted due to the lattice structure of the processing baskets and the depth of the granular material fill to be penetrated.

The object of the invention is to provide a method and a device for washing/cleaning of slag granular material enabling more efficient removal of attached environmentally harmful substances. In particular, it shall thereby reduce chloride and sulphate contents such as to meet the grading value Z1 according to TR-LAGA.

The object of the invention is achieved in that the process liquid is located in an upright cleaning channel with an upper feeding end and a lower extraction end, that the granular material is introduced into the cleaning channel from the feeding end and moves downwards towards the extraction end due to the force of gravity, and is subjected to ultrasound during the sinking movement. This offers the advantage that every individual slag or ash particle freely moves in the fluid, thereby enabling its subjection to ultrasound without any adverse effect. Due to the irregular structure of a grain, such grain will inevitably rotate. Here, this is an advantage as the grain will then be subjected to ultrasound from all sides. This causes good cleaning.

Such cleaning also depends on the retention time of a grain in the cleaning channel. The longer the retention time, the better the release of any impurities from the grain. Where said slag granular material is introduced into the cleaning channel with stagnant liquid, retention time will be determined among others by the height of the cleaning channel. Therefore, said cleaning channel should be relatively long to enable sufficient retention time, such that the cleaning device should be constructed relatively high. This is inconvenient, though. Moreover, a large plurality of ultrasound generators would be required to be provided along the channel. This would entail high investment costs.

Therefore, a preferred embodiment of the invention provides that said cleaning channel is flown through from the bottom to the top by process liquid and liquid escaping from the feeding end is extracted via an overflow. This causes with simple means the sinking velocity of a grain to slow down, thereby extending retention time. Therefore, the cleaning channel can be constructed relatively low.

It can be provided that said process liquid has a consistent flow rate during processing. Moreover, it can be provided that such flow rate of said process liquid in the cleaning channel is chosen such that the granular material to be cleaned is retained in the cleaning channel and is not extracted from the feeding end into the overflow. This causes the slag granular material to remain in the cleaning channel and the particles to be kept almost suspended and are not extracted without being cleaned. This enables good subjection to ultrasound.

Moreover, the flow of process liquid against the sinking direction of the particles, light substances present in said slag are moved towards the feeding end, whereas the slag granular material remains in the cleaning channel. Then, such light substances can be separated from said process liquid by means known in the art in the overflow and for example be skimmed. A filter in or downstream said overflow can separate such light substances, too.

The process liquid flow rate depends on the density and the size of the granular material particles. In order to be able to achieve that the granular material delivered with a flow rate reliably remains in said cleaning channel and descends only slowly, it is useful to screen the granular material to be cleaned prior to its delivery into said cleaning channel within relatively tight limits.

Therefore, it is advantageous to classify said granular material to be cleaned and having a grain size of 0.25/15. mm, into five fractions A-E having the following grain sizes:

A: 0.25-1.50 mm
B: 1.50-3.00 mm
C: 3.00-5.00 mm
D: 5.00-8.00 mm
E: 8.00-15.0 mm

Therefore, a flow rate can be attributed to each fraction such that the various particles have the desired retention time in the cleaning channel. Such screening is possible without any great effort using means known in the art. It is understood that other grain limits can be set.

Basically, it is useful to deliver such granular material discontinuously. Then, it will be easily possible to set a predetermined processing time for said slag granular material. Following predeterminable processing time, granular material accumulated in the extraction air area can then be extracted. Moreover, said discontinuous principle allows for the feeding end to be closed after a predetermined time, during which said light substances were flushed out, by a filter the width of mesh of which is smaller than the smallest particle. Then, the flow rate can also be chosen such that all particles of one fraction can be flushed back upwards towards said feeding end without being extracted by the overflow.

According to another embodiment of the invention, it is provided that said process liquid is moved through the cleaning channel during processing at various flow rates. It is then advantageous that such flow rate is chosen such that the higher flow rate is sufficient to transport the granular material in the area of the extraction end back towards the feeding end. Thereby, it can be achieved that those particles of a fraction which descend more quickly, are led back into the cleaning channel, without entailing excessive extraction from the overflow.

Here, the advantage of the invention becomes particularly clear. In one cleaning channel with stagnant process liquid, retention time of the granular gains in the area subjected to ultrasound is determined by the sinking velocity and thereby in particular by the thickness, the size and the surface structure of individual granular grain. This would result in the granular grains which descend more quickly, i.e. in general, the bigger grains, to remain in the subjection zone for a relatively short period of time only and that therefore, they might not be subjected for a sufficient period of time to ultrasound to release any harmful substances from the surface. The smaller and therefore those granular grains, sinking more slowly, however, will be subjected to ultrasound for a longer period of time and therefore be cleaned better.

Where it must be ensured that even the bigger and therefore those granular grains which descend more quickly are sufficiently cleaned, this logically requires an adequate higher cleaning channel in order to allow for such grains also to be subjected to ultrasound for a sufficient period of time. This implies however additional devices and above all a very high construction design.

But where an upward flow against the sinking direction is generated in the cleaning channel, the sinking velocity of the various granular grains can be baffled. Then, the bigger grains remain in the subjection zone for a sufficient period of time and are well cleaned. The longer retention time of the small granular grains in the cleaning channel is no problem for cleaning. Moreover, the smaller granular grains represent the bigger share with a larger surface within one fraction such that a longer retention time has positive effects on the cleaning and release results.

Therefore, the invention provides for an upward flow of the process liquid smaller than the sinking velocity of the slowest descending granular grain of the grain fraction to be cleaned, which is generated at the beginning of a cleaning cycle of a batch of one granular fraction in the cleaning channel. Following addition of the batch to be cleaned, this enables quick separation and extraction of the light substances in a first place. Concurrently, this ensures that the granular material is not flushed out back from the feeding end. As soon as the batch has been entirely delivered into the cleaning channel and the light substances have been flushed out for the most part, the feeding end can be closed by a filter the mesh width of which is smaller than the smallest grain of the granular material fraction to be cleaned.

Due to their size and their condition, said granular grains have various sinking velocities which are in particular unpredictable. Therefore, they will reach the extraction end depending on their various sinking velocities. A filter can be provided preventing that the granular grains which are the first to come in, leave the cleaning area or the cleaning channel without any further processing. As soon as the first bigger and therefore more quickly descending granular grains reach the extraction end, pump output of the transfer pump can be increased for the process liquid such that a higher flow rate against the sinking direction in the cleaning channel is generated. Such pump output can be increased and set such that the bigger granular grains arriving first at the extraction end are flushed back into the cleaning channel. Thereby, their retention time in the subjection zone is increased without any further construction measures.

Due to operation by batches, there are no more granular grains in the feeding end area, when the first granular grains reach the extraction end. It can also be provided that the higher flow rates are maintained as long as the granular grains arrive back at the feeding end. Then, the pump output is lowered such that the upper granular grains sink down again. Thereby, ultra sound subjection of all granular grains can be ensured for a predetermined retention time, even in a relatively short respectively low cleaning channel. Due to increased flow rate, the smaller granular grains which therefore descend more slowly, are moved more quickly upwards towards the feeding end. Here, the filter prevents any extraction of such granular grains from the cleaning channel.

Here, the advantage of an upward and intermittent flow rate in the cleaning channel becomes clear, as thereby the smaller granular grains will not accumulate at the upper filter. Following switch-off of the pump or following lowering of the flow rate, they will instead slowly move downwards again through the cleaning channel, where they are subjected to ultrasound.

The problem with such a principle is that the sinking velocities of the various granular grains within one granular material fraction cannot be predicted or can be predicted only inaccurately. This is in particular due to the various densities and the various surface structures of the individual granular grains. Therefore, the invention provides detection means which are located at the lower end of the cleaning channel and upstream the extraction end and which detect the presence of at least the bigger granular grains or the arrival of granular grains which descend most quickly. Upon detection of the first granular grain the parameters relevant for processing this batch are set. Indeed, the other granular grains sink more slowly and are therefore still in the subjection zone of the cleaning channel on their way downwards towards the extraction end.

The flow rate is not increased until said granular grains move back upwards. This flow rate can be maintained, alternatively, it can be increased any further. Following a predetermined period of time, such flow rate will be reduced again such that said granular grains start depositing again. This process is rerun until the predetermined retention time for said granular grains which sink more quickly has been achieved. Then, all the other granular grains have been subjected to ultrasound for a sufficient period of time. Subsequently, such cleaned granular material is extracted at the extraction end and the following batch can be delivered.

Owing to an increased flow rate, even the granular grains sinking more slowly are carried upwards and accumulate at the upper limiting filter and are then located outside the subjection zone. Therefore, it is useful to have at least one additional detection means which detects the presence of at least one granular grain and which is located in the cleaning channel upstream the first detection means and downstream the upper limiting filter.

As soon as one granular grain or one granular grain of a specific size has come back to the feeding end, the flow rate will be reduced again such that all granular grains can descend again. This ensures that all or almost all granular grains are located in the area of ultrasound subjection. The cleaning result is thereby optimised. With this type of conduct of proceedings, it is useful to ensure ultrasound subjection even during the upward movement of the granular grains. Hence, such ultrasound subjection can act on the introduced granular material as long as such granular material is located in the cleaning channel.

The detection means can have an optical effect or operate by ultrasound. Optical means have the disadvantage that process liquid is or becomes relatively slurry in the course of operation. Nevertheless, an inspection glass in the area of the extraction end or the feeding end can be useful.

The invention also relates to a device to carry out the method. The device includes a cleaning channel and at least one ultrasound generator subjecting the cleaning channel and the process liquid therein as well as the granular material therein to ultrasound. The invention proposes that the cleaning channel extends in its longitudinal extension from an upper feeding end to a lower extraction end, that ultrasound generator are located along said longitudinal extension of the cleaning channel, that the extraction end is connected to a feed conduct for process liquid, such that delivered process liquid flows from the bottom to the top, and that the feeding end is connected to an overflow in order to extract process liquid escaping from the cleaning channel. The cleaning channel thereby oriented upright or vertically is easily accessible from all sides such that the ultrasound generator can be easily arranged at the boundary walls of the cleaning channel or constitute the latter.

A vertical orientation of the cleaning channel furthermore provides the advantage that the granular grains have no or little contact only with the side walls of the cleaning channel during sedimentation. Then, said granular grains can freely rotate during ultrasound subjection and wear of the inner surfaces of the cleaning channel is minimised.

It can be provided that the cross section of the flow channel is circular and that the ultrasound generators are located along the circumference of the flow channel. In that case, the efficient surface of an individual ultrasound generator is relatively small and the distance to the particles can be relatively big, depending on the diameter of the pipe.

Therefore, it is useful for the cross section of the cleaning channel to be essentially rectangular in shape and having at least two flat sides extending along the flow direction and parallel to each other and that said ultrasound generators are located along the flat sides. Then, the ultrasound generators can be in the shape of plate oscillating elements. This model of a cleaning channel enables conduction of process liquid into a narrow channel such that the distance between the various particles and the ultrasound generator can be kept relatively small. It can be 10 mm to 40 mm, for example. Thereby, power density measured in Watt by litre process liquid will be increased and every particle can easily be subjected to ultrasound. It can then be provided that the sound emission surfaces of the ultrasound generators constitute the flat sides of the cleaning channel at least partially.

The power density is one criterion of efficiency for ultrasound cleaning. Power density indicates the ultrasound power by volume unit which can be generated by means of an ultrasound generator. Using a tubular reactor with a cleaning channel having a circular cross section as well as the ultrasound generators known in the art having a power of 1,000 W, enables achievement of a power density of approximately 500 W/l in a 2" cleaning pipe (diameter=5.08 cm). For a 3" cleaning pipe (diameter=7.62 cm) and ultrasound power of 2,000 W by ultrasound generator, such power density comes to approximately 450 W/l.

For a rectangular cleaning pipe and a plate-shaped ultrasound generator having a sound emission surface of 565 mm×355 mm and a power of 2,000 W, power density comes to approximately 1,000 W/l when using two opposite ultrasound generators and a distance of 20 mmm. This enables shorter retention time of the granular material in the cleaning channel.

According to a further embodiment of the invention, it is provided that a flat side is movable with the ultrasound generator or the ultrasound generators back and forth towards the opposite flat side and that the narrow sides of the cleaning channel are connected upright to the flat sides by means of elastic seals or are constituted by elastic seals. Thereby, it is possible to easily adjust the device to various conditions and various power densities.

A filter the mesh width of which is smaller than the smallest diameter of the granular particles can be provided upstream the feed conduct for the process liquid. This prevents granular particles which descend more quickly from passing through the feed conduct, reaching the pump for process liquid and thereby damage the pump.

For the purpose of a discontinuous operation, it is useful for the feed conduct and the filter to be kept movable back and forth to the extraction end in order to unblock or to close said extraction end and that a collection device for the granular material lying on the filter is provided downstream the extraction end. Said cleaning channel can also be lockable upstream the extraction end by means of a slide-valve or a valve. When changing the granular material, the liquid will thus not be removed entirely from said cleaning channel.

It is also useful to provide an inspection glass or detection means at least upstream said extraction end, which can allow for detection of the presence of a granular grain. Such an inspection glass or such detection means can also be provided downstream the feeding end. This enables monitoring and control of sedimentation behaviour of the delivered granular material such that the pump can be controlled accordingly to generate flow for the process liquid against the sinking direction. In particular, control can be carried out in such a way that the granular grains are located predominantly in the zone of the cleaning channel subjected to ultrasound. Thereby, good cleaning of the granular material is achieved as all granular grains reliably remain in the cleaning channel during the predetermined retention time where they are subjected to ultrasound.

Therefore, one embodiment of the invention provides an inspection glass and/or a detection means in the sinking direction downstream the cleaning channel and upstream the extraction end and/or in the sinking direction upstream the cleaning channel and downstream the inspection glass in order to detect the presence or the arrival of a granular grain in respectively at the extraction end or in respectively at the feeding end. This allows for detection of the sedimentation behaviour of the processed granular material fraction. It is in particular possible to detect the quickest sinking granular grain, such that the pump output can be controlled accordingly in order to maintain said granular grains in the cleaning channel in the subjection zone of the ultrasound generators.

It can furthermore be provided that the overflow empties out in a drum screen where the floating suspended particles or light substances are separated from the process liquid. A drum screen is very efficient for separation purposes of such light substances and it is possible to connect several cleaning devices to a joint drum screen, such that the number of machines deployed can be kept small in case of increased throughput due to several cleaning devices operating simultaneously.

Figure 2:
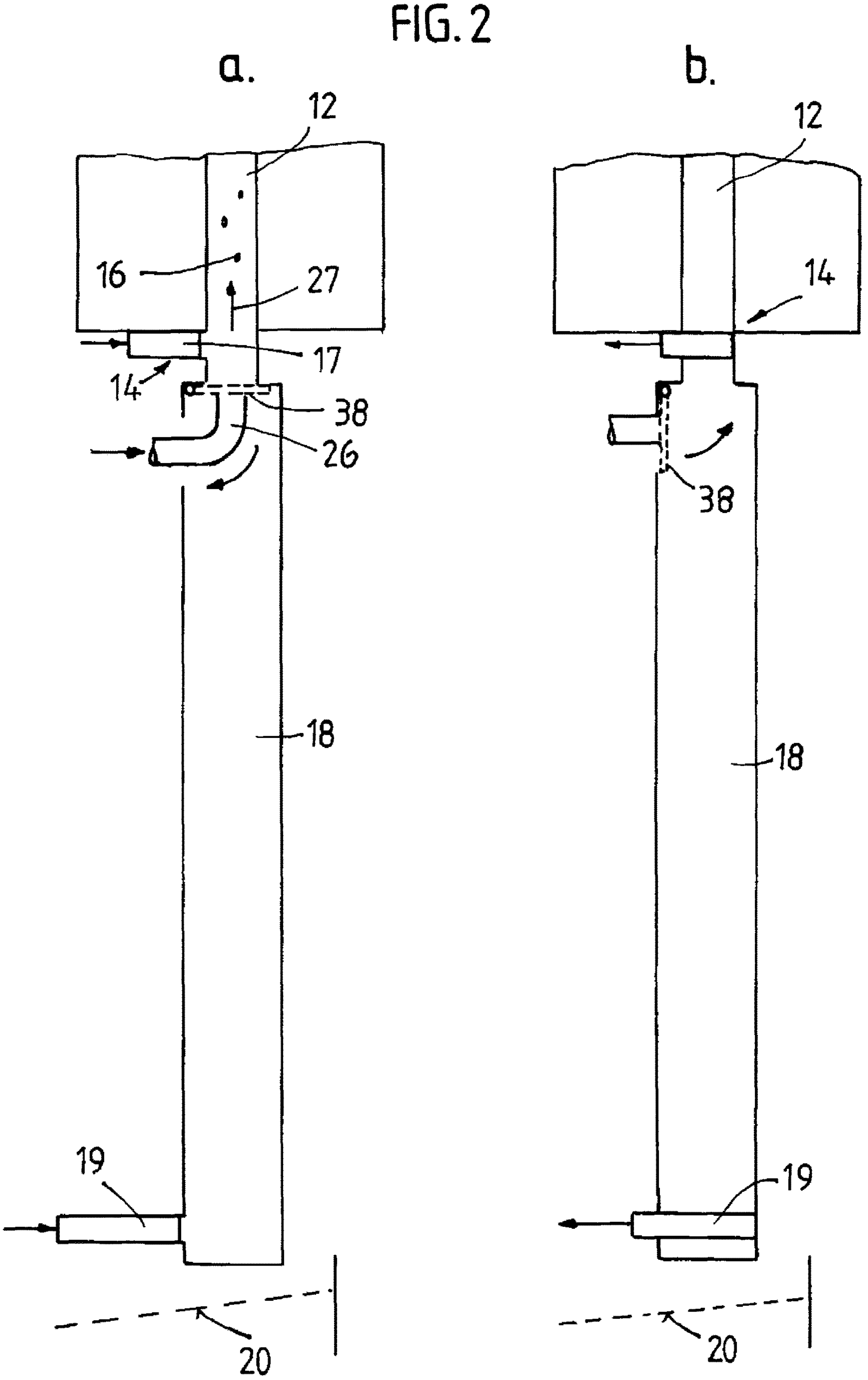
Figure 3:
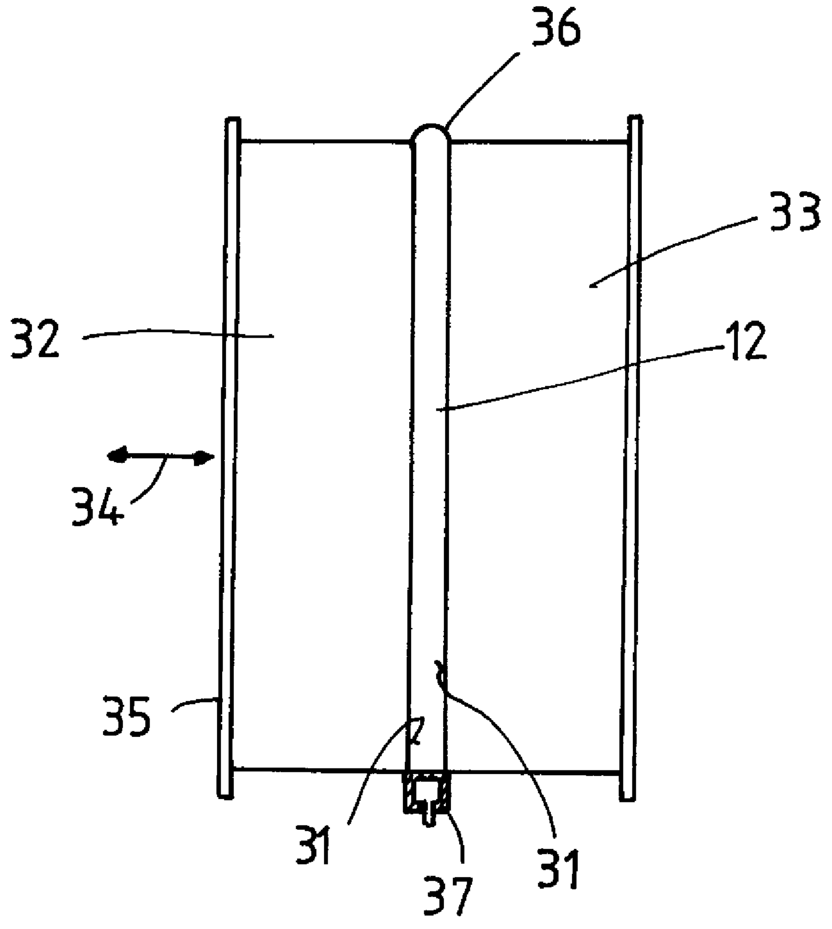
Figure 4:
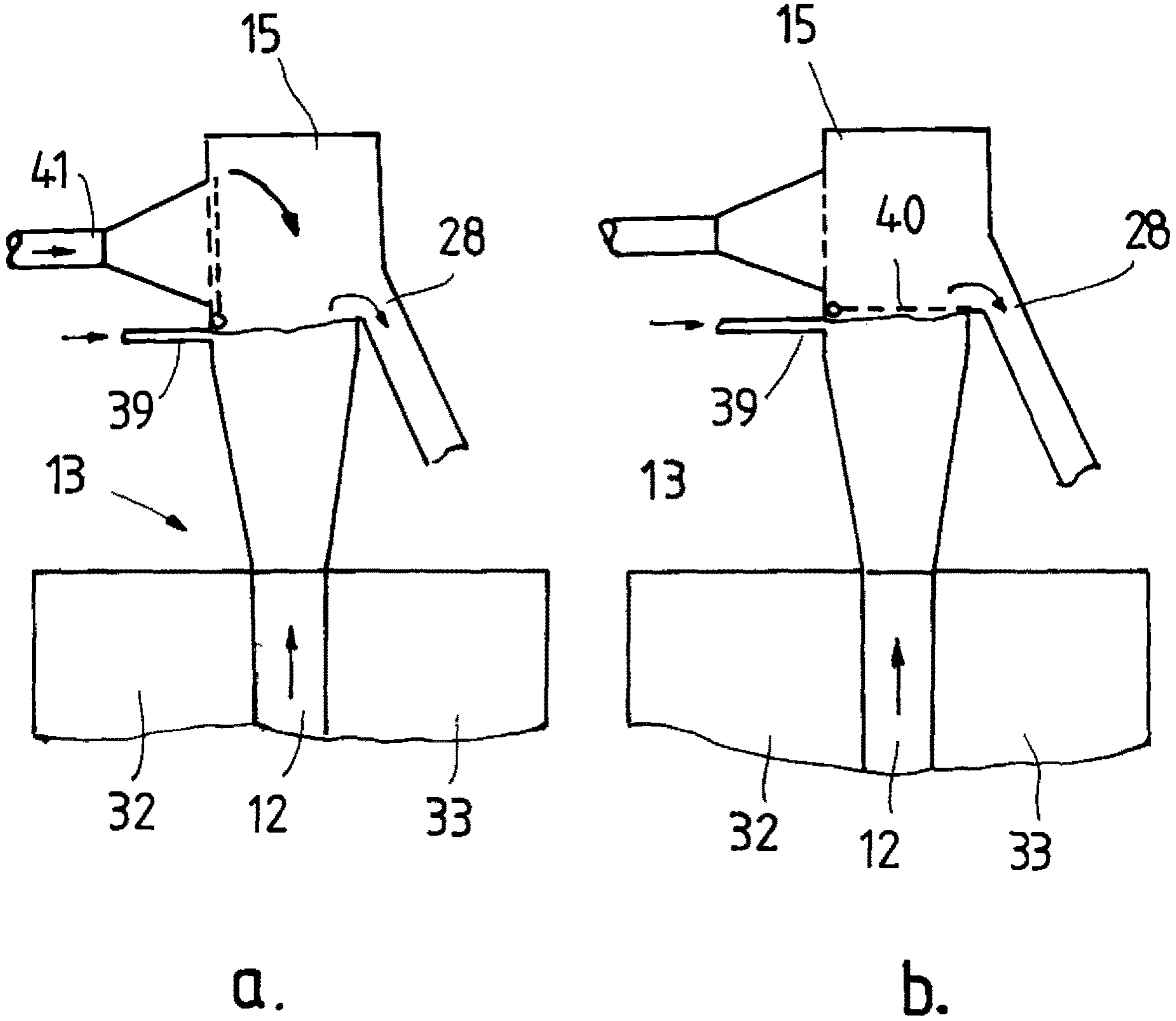

Hereinafter, the invention shall be explained by means of the schematic drawings. The drawings show:

FIG. 1 the view of a device according to the invention,

FIG. 2*a* the device during cleaning,

FIG. 2*b* the device during emptying,

FIG. 3 the top view of the cleaning channel,

FIG. 4*a* the view of the delivery device at the beginning of the cleaning and FIG. 4*b* the view of the delivery device during cleaning.

The device for cleaning of slag granular material illustrated in the drawing comprises an upright cleaning chamber 11 wherein an upright and vertical cleaning channel 12 is provided. At its upper end, said cleaning channel 12 is limited by a feeding end 13 and at its lower end, by an extraction end 14. During cleaning operation, said cleaning channel 12 is filled with process liquid. Such process liquid can be water.

A delivery device 15 is provided upstream said feeding end through which the granular material to be cleaned can be delivered to the cleaning channel 12. Said granular material is constituted by a slag granular material from a specific grain fraction. Due to the specific weight of the particles which is higher than the weight of the process liquid and due to gravity, the various granular particles 16 descend from the feeding end 13 to the extraction end 14. Said extraction end 14 is closed by means of a slide-valve 17. A collection tank 18 is provided downstream said slide-valve 17. Following opening of said slide-valve 17, the granular particles 16 located thereon and the process liquid end up in the collection tank 18.

At its lower end, said collection tank 18 is also closed by means of a slide-valve 19. When opening the same, said granular material falls onto a filter 20 through which it is separated from said process liquid. The granular material is extracted. Such process liquid is collected in a collection tank 21 and delivered to a storage tank 23 for process liquid, using a pump 22.

Such storage tank 23 can be filled with fresh process liquid 24. From said storage tank 23, the process liquid is pumped by means of a pump 25 from the bottom, through a pipe 26, into the extraction end 14 and thereby into the cleaning channel 12. A flow of the process liquid towards the arrow 27 is generated against the sinking direction of the granular particles 16 in the cleaning channel 12. Such sinking velocity of the granular particles 16 in the cleaning channel 12 is controllable by means of the flow rate of said process liquid in the cleaning channel.

Due to the upwards flow of the cleaning liquid in the cleaning channel 12, the light substances filled in together with the granular material are separated from the descending granular material and transported upward to the feeding end 13. The delivery device 15 has an overflow 28 such that the light substances floating on the surface can be extracted together with the overflowing process liquid. Said overflow 28 empties out into a filter 29 through which the light substances are separated from said process liquid. The overflowing process liquid arrives in the storage tank 23 via a collection tank 30 downstream the filter 29.

In the exemplary embodiment illustrated in the drawing, said cleaning channel 12 is formed as a gap which is essentially rectangular. Such gap is limited by two opposite flat sides 31 and has a relatively small width which comes for example to only 10 mm to 30 mm, depending on the grain size of the granular material. Opposite plate-formed ultrasound generators 32, 33, the facing radiation surfaces are oriented towards the gap 12 are provided on the flat sides 31. In the top view according to FIG. 3, such gap is therefore limited by two ultrasound generators 32, 33 and by two narrow sides.

The plate-formed ultrasound generators 32, 33 can for example have a radiation surface of 565 mm×365 mm and extend over the entire width of said cleaning channel 12. Several ultrasound generators 32, 33 are stacked depending on the height of the cleaning channel 12. Three ultrasound generators 32, 33 are stacked in the exemplary embodiment shown.

For example, the power of said ultrasound generator 32, 33 can be 2,000 W. Such ultrasound generators are generally known in the art and require no further explanation. The power density which is relevant for cleaning the granular material depends in particular on the width of the gap of the cleaning channel 12. In order to achieve any change in the power density in the process liquid, it is possible to change the distance of the flat sides 31 and thus the radiation surfaces of the ultrasound generators 32, 33. To this end, the one or several ultrasound generator(s) 32 is/are located movably back and forth on the one side of the cleaning channel 12, transversally to the gap towards the arrow 34 on one traverse 35. The narrow sides can be constituted by an elastic side wall 36 or by an inflatable hose seal 37. A sealed cleaning channel 12 is constituted in any case, the width of which can be modified within a range of 10 mm to 30 mm, for example.

This enables adjustment of the power density in W/l to the granular material to be cleaned.

Such cleaning liquid is pumped via the pump 25 from the storage tank 23 through the pipe 26 into the cleaning channel 12. In more detail, this arrangement herein provides for the pipe to be located downstream the extraction end 14 of the cleaning channel and be fixed on a filter 38 extending over the pipe orifice. Thereby, descending particles are prevented from reaching and damaging the pump 25. The filter 38 is located hingeably downstream the extraction end 14.

During operation according to FIG. 2*a*, the granular material to be cleaned is delivered into the cleaning channel 12 by batches via the delivery device 15. The slide-valve 17 has been opened and the filter 38 with its pipe 26 is located downstream the extraction end 14. The pump 25 conducts the process liquid through the pipe 26 in the cleaning channel 12 such as to generate a flow in the direction of the arrow 27. The flow rate has been chosen such that the descending particles 16 are conducted back upwards towards the feeding end 13. Thus, the flow rate can be constant or, for example, intermittently pulsating, depending on the particle size of the granular material. Thereby, retention time of the particles 16 in the cleaning channel 12 is increased.

The pump 25 is thus set such that the process liquid rises and flows out via the overflow 28. Then, the light substances can be separated. Said overflowing process liquid is collected and conducted to the storage tank 23 such that it can circulate in a cycle. Only where a predetermined content of released impurities has been achieved, said process liquid can or must be treated or replaced.

Due to the upward oriented flow, the light substances are moved upwards in a first place. From there, they can be extracted via the overflow 28. To this end, water can transversely be delivered via a nozzle bar 39, thereby generating a surface flow towards the overflow 28 and quickly separating the light substances before they can get waterlogged and descend.

In order to prevent any extraction of the granular material to be cleaned via the overflow 28, a partition grid 40 is located in the flow area, the mesh width of which is smaller than the smallest particle to be cleaned. In detail, arrangement is provided such that said partition grid 40 is raised during filling of the delivery device 15 according to illustration of FIG. 4*a*. The granular material to be cleaned falls into the cleaning channel 12, together with the light substances.

During the filling process, process liquid already flows from the bottom to the top such that the lighter light substances are extracted preferably. The flow rate is chosen such that the light substances are carried upwards while the heavy granular material continues to descend.

Simultaneously, the partition grid 40 is subjected to air from its backside via a channel 41. Thereby, the partition grid 40 is cleaned from any potential attached light substances from the previous batch and simultaneously, the air flow also ensures more rapid transport of the floating light substances towards the overflow 28.

After removing the light substances, the partition grid 40 pivots into the horizontal position as illustrated in FIG. 4*b*, and closes the cleaning channel 12. As the mesh width of the partition grid 40 is smaller than the smallest grain of the granular material, it is now possible to raise the flow rate and thereby the upward flow of the process liquid such that individual granular materials rise upwards to the delivery end 13 of the cleaning channel 12 and descend again when the flow rate decreases, whereby achieving an optimum cleaning effect due to long retention time. The filling process and the first cleaning while the partition grid 40 being open can take approximately 5 to 20 and in particular 5 to 10 seconds. The following cleaning while the partition grid 40 being closed can take approximately 10 to 80 and in particular 20 to 60 seconds.

Following completion of the cleaning process, the flow is interrupted or decreased such that the cleaned particles descend and accumulate on the filter 38. The side-valve 17 downstream the cleaning channel 12 can be closed such that the process liquid relieved from the granular material remains in the cleaning channel 12. During extraction of the cleaned granular material and prior to filling in the following batch, it is also possible to already let process liquid flow into the cleaning channel 12 via the channel 39 and have it filled. Cycle time is thereby diminished, respectively optimised.

The filter 38 is hinged down and the side-valve 14 is opened such that the particles 16 fall into the collection tank 18 on the slide-valve 19 which is closed there. Thereupon, the slide-valve 14 is closed again. This is illustrated in FIG. 2*b*.

The slide-valve 19 is opened and the cleaned granular material, together with the process liquid, reach the filter 20, where it is extracted from. Said process liquid so co-extracted is pumped back into the storage tank 23 by means of the pump 22. This process liquid, too, is thereby recycled into the circuit.

In order to enable control or monitoring of the sedimentation behaviour of the delivered granular material, an inspection glass and/or detection means 42 enabling detection or viewing of the presence of a granular grain can be provided downstream the cleaning channel 12 and upstream the extraction end 14 or in the area of the extraction end. This makes it possible to detect when the first and the most rapidly descending granular grain has reached the extraction end 14. Then, it is possible to trigger the pump 25 such that such granular grain respectively the first incoming granular grains are carried back upwards.

Upon arrival of granular grains at the upper feeding end 13, pump output can be reduced such that sedimentation takes places again towards the extraction end 14. Upstream the cleaning channel 12 and downstream the partition grid 40 or in the area of the feeding end, an inspection glass and/or detection means 43 can therefore also be provided, allowing for detection or viewing of the presence of a granular grain. Then, it is possible to detect that the granular grains were carried back upwards. The pump output of the pump 25 is choked such that the granular grains descend back. The detection means 42, 43 are shown in the drawing only in FIG. 1.

This process is rerun until the predetermined retention time has been achieved. Detection of the granular grains at the extraction end and at feeding end can enable control of the pump output and thereby the flow rate of the process liquid in the cleaning channel 12 against the sinking direction such that all granular grains are predominantly located in the subjection zone between the ultrasound generators 32, 33 during the retention time.

Such a device allows for subjection on an individual basis to ultrasound of every particle of the DWIP-slag to be cleaned. There are no perturbing fixtures. Due to the gap-shaped cleaning channel, depth of penetration of the acoustic waves through the cleaning liquid until striking the particle is relatively low, such as to achieve a good cleaning effect. The number of machines deployed is small and the process liquid is recycled in a circuit. Thereby, it is possible to generate a processed slag meeting the critical values for sulphates and chlorides for the grading values Z1, Z1.1, or Z1.2 pursuant to "TR-LAGA". Easy further use of the slag so cleaned is thus possible.

The invention claimed is:

1. A method for washing/cleaning granular material from slag as well as bottom/boiler ash from a thermal waste treatment as well as mineral residue and recycling material, wherein in such method the granular material is added to a process liquid and is subjected to ultrasound therein, wherein said process liquid is located in an upright or vertical cleaning channel with an upper feeding end and a lower extraction end, in which method the granular material is classified within tight grain size limits into a plurality of screened fractions and only one of the plurality of screened fractions is delivered from the upper feeding end into the cleaning channel at a time and moves freely downwards in the process liquid towards the lower extraction end due to the force of gravity and is subjected to ultrasound during the sinking movement, such that the cleaning channel is flown through by the process liquid from the bottom to the top at a flow rate to slow down sinking speed of the granular material which flow rate is attributed to each screened fraction such that various particles of the screened fraction selected for treatment have a desired retention time in the cleaning channel, and the liquid escaping from the upper feeding end is extracted via an overflow.

2. The method according to claim 1, wherein the process liquid has a consistent or pulsating flow rate during processing.

3. The method according to claim 2, wherein the flow rate of said process liquid in the cleaning channel is chosen such that the granular material to be cleaned is retained in the cleaning channel and is not extracted from the feeding end into the overflow.

4. The method according to claim 1, wherein during processing, said process liquid is moved through the cleaning channel at various flow rates, such flow rates being chosen such that a higher flow rate is sufficient to transport the granular material located in the area of the lower extraction end back towards the upper feeding end.

5. The method according to claim 1, wherein the granular material is delivered discontinuously.

6. The method according to claim 1, wherein the granular material to be cleaned has a grain size of 0.25 mm to 15.0 mm and is classified into five fractions having grain sizes of 0.25 mm to 1.50 mm, 1.50 mm to 3.00 mm, 3.00 mm to 5.00 mm, 5.00 mm to 8.00 mm and 8.00 mm to 15.0 mm.

* * * * *